A. G. BUZBY.
GAS-KEY.
No. 189,695. Patented April 17, 1877.
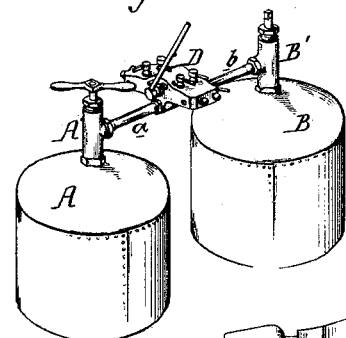
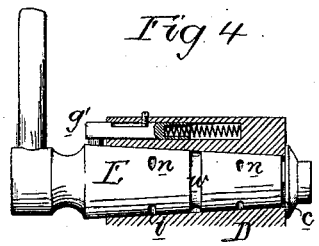
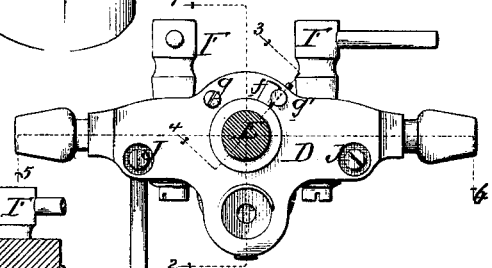
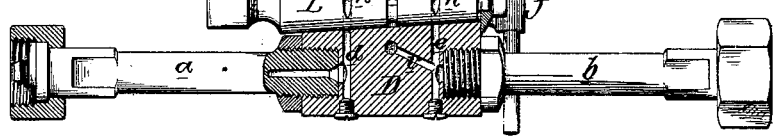
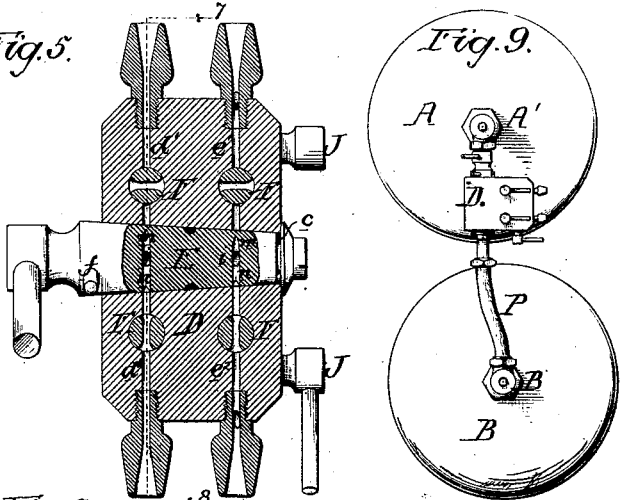
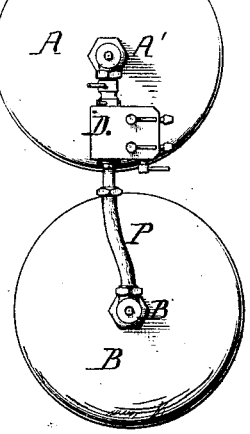
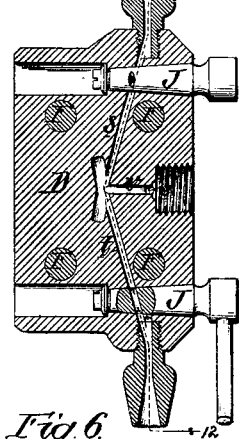
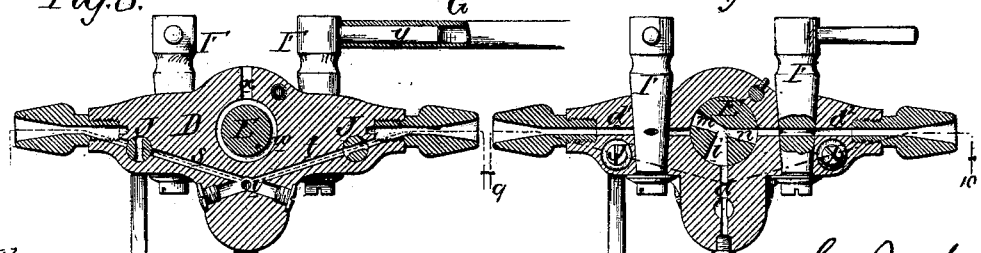
Witnesses.
John M. Deemer
John K. Robertus
Albert G. Buzby
by his Attorneys Howson & Son

UNITED STATES PATENT OFFICE.

ALBERT G. BUZBY, OF PHILADELPHIA, PENNSYLVANIA, ASSIGNOR TO EDWARD ANTHONY, HENRY T. ANTHONY, AND V. M. WILCOX, OF NEW YORK CITY.

IMPROVEMENT IN GAS-KEYS.

Specification forming part of Letters Patent No. 189,695, dated April 17, 1877; application filed February 16, 1877.

*To all whom it may concern:*

Be it known that I, ALBERT G. BUZBY, of Philadelphia, Pennsylvania, have invented a High-Pressure Dissolving and Quick-Light Gas-Key, of which the following is a specification:

My invention relates to improvements in the devices known as gas-dissolvers, or gas-keys, which are used in connection with calcium or lime-light apparatus; and the object of my invention is to construct a device of this character for gases under heavy pressure, and for insuring rapidity and certainty of action.

In the accompanying drawing, Figure 1 is perspective view, drawn to a reduced scale, of my dissolving apparatus; Fig. 2, a side view of the apparatus; Fig. 3, a transverse section on the line 1 2, Fig. 2; Fig. 4, a section on the line 3 4, Fig. 2; Fig. 5, a section on the line 5 6, Fig. 2; Fig. 6, a section on the line 7 8, Fig. 5; Fig. 7, a section on the line 9 10, Fig. 6; Fig. 8, a section on the line 11 12, Fig. 7; and Fig. 9, a view of a single quick-light apparatus constructed according to my invention.

I will first proceed to describe my invention as applied to a dissolver—that is, a device for cutting off the supply of gases from one apparatus and simultaneously admitting them to another.

A and B represent two reservoirs, the former containing oxygen and the latter hydrogen gas, both under pressure.

These reservoirs have at the top valved boxes A' and B', which are connected, by means of rigid pipes $a$ and $b$, with a block, D, passages in which serve to distribute the gases, as described hereafter, the block, owing to its rigid connections, forming, in effect, part of the reservoirs.

In this block D are formed six main passages, $d$, $d^1$, and $d^2$, and $e$, $e^1$, and $e^2$, all of which communicate with a central opening, $c$, to which is adapted a valve-plug, E.

The passage $d$ serves to establish communication between the opening $c$ and the pipe $a$ communicating with the oxygen-reservoir, and the passage $e$ between said opening and the pipe $b$ communicating with the hydrogen-reservoir, while the passages $d^1$ and $e^1$ open communication between the opening $c$ and pipes leading to the oxygen and hydrogen jets, respectively, of one burner, and the passages $d^2$ and $e^2$ between said opening and pipes leading to the oxygen and hydrogen jets of another burner.

In the valve-plug E are formed two openings, one in line with the passages $d$, $d^1$, and $d^2$, and the other in line with the passages $e$, $e^1$, and $e^2$, and each opening has three branches, $i$, $m$, and $n$, which, as the valve-plug is moved, serve to open communication between the passages $d$ and $e$ and the passages $d^1$ $e^1$ or $d^2$ $e^2$, the movement of the valve-plug being restricted under ordinary circumstances by means of a pin, $f$, on its stem in conjunction with pins $g$ $g$ on the face of the block D, and the branches $i$ of the openings in the plug being of such a width that when the movement of the pin $f$ is restricted to the space between the pins $g$ $g^1$ they will always be in communication with the passages $d$ and $e$.

The branches $m$ and $n$ of the valve-plug openings are of a V-shape, as best observed in Fig. 3, so that the admission of the gases to, and cutting them off from, the passages $d^1$ $d^2$ or $e^1$ $e^2$ will be easy and gradual, and this object may be more thoroughly accomplished by making the passages themselves V-shaped. The pin $g$ of the block D is, in the present instance, fixed, and the pin $g$ is acted upon by a spring, so that it can, when occasion requires, be depressed, in order to permit the movement past it of the pin $f$ on the stem of the valve-plug E, thereby permitting the latter to be so turned that the supply of gases will be entirely cut off from the passages $d^1$ $d^2$ and $e^1$ $e^2$. Both of the pins $g$ $g^1$ may be adjustable in this way, if desired, in order to permit the cutting off of the gases by a movement of the plug E in either direction.

Each of the passages $d^1$ $d^2$ and $e^1$ $e^2$ has a valve, F, by which the course of the gases through the same can be regulated at pleasure, each of these valves having, by preference, a passage made V-shaped at the ends. In the block D are formed passages $s$ and $t$, the former of which extends from about the center of the block D to the passage $e^1$ at a point between the outer end of the same and its valve F, while the passage $t$ extends from about the center of the block D to the passage $e^2$ at a point similar to that at which the passage $s$ communicates with the passage $e^1$.

The passages $s$ and $t$ communicate with each other at the center of the block D, and also communicate, through a passage, $v$, with the passage $e$, and consequently with the hydrogen-reservoir, and both of said passages $s$ and $t$ are furnished with valves J, having V-shaped openings.

In the valve plug E, at a point midway, or thereabout, between the openings in the same, is formed a groove, $w$, the annular chamber thus produced communicating through a passage, $x$, with the atmosphere.

By this means any of the gases which leak around the plug E are carried off on arriving at the groove $w$, so that the accumulation of the two gases under pressure, and the formation of a dangerous and explosive compound thereby, is prevented.

In order to facilitate the turning of the various valves of the device, I provide their stems with short arms $y$, to which I adapt the end of a tubular rod, G, the bore of which is fitted to the arm, and which is of such a length that a sufficient leverage is gained to insure the easy turning of the valves, which would otherwise be difficult to manipulate, owing to the fact that they must fit very tightly to their seats in order to prevent the leakage of the gases, the pressure of the latter being generally very high.

The mode of operating the above-described device is as follows:

Supposing, in the first instance, that all the valves are closed, the first operation will be the opening of the valves in the boxes A' and B' of the reservoirs, so as to permit the oxygen to enter the passage $d$ and the hydrogen to enter the passages $e$, $s$, and $t$.

The valves in the passages $s$ and $t$ are now so operated that a limited supply of hydrogen is permitted to pass to the burners of both apparatus, so that when lighted it will form a small jet sufficient to cause the ignition of the combined gases when admitted to the burners.

The valve-plug E is then so operated that it will open communication between the passages $d$ and $e$, and either the passages $d^1$ and $e^1$ or $d^2$ and $e^2$—say, for instance, the passages $d^1$ and $e^1$. The valves F in these passages are then manipulated, so that the proper quantity of each gas necessary to form, when combined, a perfect light is permitted to pass to the burners. As soon as this is determined the valve-plug E is turned over, so as to cut off the gases from the passages $d^1$ and $e^1$, and direct them to the passages $d^2$ and $e^2$, the valves F in which are then operated in the same manner and for the same purpose as the valves in the passages $d^1$ and $e^1$.

The device is now in proper working order, the passage of the gases to either apparatus being governed by the mere partial turning of the plug E, the previous adjustment of the valves F serving to insure the combination of the gases at the burners in the proper proportions to produce a perfect light.

It will be seen that, owing to the V shape of the branches $m$ and $n$ of the openings in the valve-plug E, the shutting off or turning on of the gases to the passages $d^1$ $e^1$ or $d^2$ $e^2$ will be gradual, so that the proper dissolving effect will be produced without affecting the quick-light properties of the device. The proper movement of the valve-plug E is determined by the pins $g$ and $g^1$ of the block D in connection with the pin $f$ of the valve-stem; but when it is desired to shut off the supply of gases to both apparatus the pin $g^1$ is depressed, so as to permit the further rotation of the plug, the effect of this further rotation being to shut off the communication between the passages $d$ and $e$ and the branches $i$ of the openings in the plug E.

My invention is especially adapted to the production of a quick-light gas-key, owing to the ease with which the gases can be entirely cut off from both the main passages simultaneously, leaving only a small supply of hydrogen to pass to the burner through the supplementary hydrogen-passage, so as to form a small jet which serves to ignite the combined gases when the latter are again turned on.

In constructing single quick-light keys the block D has but one set of passages, $d^1$, $e^1$, and $s$, and the openings in the valve-plug E have but two branches, $i$ and $m$.

In this case, also, I prefer to secure the device permanently to one reservoir, and to effect the connection with the other reservoir by means of a section of lead pipe, P, so that the device forms part of, and is transported with, one reservoir. The position of the block, however, may be varied in various ways without departing from the spirit of my invention.

Important features of my invention are the making of the block D of a single homogeneous casting, within which all of the passages are formed, and the connection of this device to the reservoirs by rigid connections, as it is by these means that I reduce the liability of leakage, which is caused by the use of jointed pipes for the passage of the gases, and which has been one of the principal objections to the employment of gases under heavy pressure in apparatus of the class to which my invention relates.

I claim as my invention—

1. The combination of two gas-reservoirs and one or more calcium-light apparatus with a distributing-block, consisting of a single homogeneous casting, as set forth.

2. A high-pressure gas-dissolver or quick-light gas-key, in which are combined within a single casing valved passages for the various gases, and a controlling-valve for directing the gases to or cutting them off from said passages.

3. The combination, of two high-pressure gas-reservoirs, A and B, with a distributing-block, D, rigidly secured to one reservoir, and connected to the other by a pipe, P, and detachable coupling, as and for the purpose set forth.

4. The block D, having passages $d$ and $e$ and valved passages $d^1 e^1$ or $d^2 e^2$, and a valve-plug, E, serving to open or close communication between said passages $d$ and $e$, and the valved passages $d^1 e^1$ or $d^2 e^2$, as set forth.

5. The combination of the block D, and its passages $d$, $d^1$, and $d^2$, and $e$, $e^1$, and $e^2$, with the valve-plug E, having two openings, each composed of three branches, $i$, $m$, and $n$, as set forth.

6. A valved gas-key, in which the passage in the body, or the passage in the valve, or both, are made V-shaped, for the purpose set forth.

7. The combination of the passages $d^2$ and $e^2$ of the block D with the passages $s$ and $t$ of the same, as set forth.

8. The combination of the valve-plug E, having a groove, $w$, with the passage $x$ in the block D, as set forth.

9. The combination of the valve-stems and their arms $y$ with the tube G, adapted to said arms, as set forth.

10. The combination of the valve-plug E with stops for limiting the movement of the plug, either or both of said stops being movable, as and for the purpose set forth.

In testimony whereof I have signed my name to this specification in the presence of two subscribing witnesses.

ALBERT G. BUZBY.

Witnesses:
HERMANN MOESSNER,
HARRY SMITH.